United States Patent
Zijlman et al.

(10) Patent No.: US 10,172,211 B2
(45) Date of Patent: Jan. 1, 2019

(54) LED LIGHTING SYSTEM

(71) Applicant: PHILIPS LIGHTING HOLDING B.V., Eindhoven (NL)

(72) Inventors: Theo Gerrit Zijlman, Eindhoven (NL); Berend Jan Willem Ter Weeme, Eindhoven (NL); Liang Shi, Eindhoven (NL); Aart Jan Vroegop, Eindhoven (NL); Lambertus Adrianus Marinus De Jong, Eindhoven (NL); Jian Jiang, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/522,722

(22) PCT Filed: Nov. 3, 2015

(86) PCT No.: PCT/EP2015/075496
§ 371 (c)(1),
(2) Date: Apr. 27, 2017

(87) PCT Pub. No.: WO2016/071297
PCT Pub. Date: May 12, 2016

(65) Prior Publication Data
US 2017/0318633 A1    Nov. 2, 2017

(30) Foreign Application Priority Data

Nov. 4, 2014 (WO) ................. PCT/CN2014/090239
Dec. 1, 2014 (EP) ...................................... 14195553

(51) Int. Cl.
*H05B 37/02*  (2006.01)
*H05B 33/08*  (2006.01)

(52) U.S. Cl.
CPC ....... *H05B 33/089* (2013.01); *H05B 33/0845* (2013.01); *H05B 37/0272* (2013.01); *Y02B 20/341* (2013.01)

(58) Field of Classification Search
CPC ............ H05B 33/0884; H05B 33/0836; H05B 33/0839; H05B 33/0842; H05B 33/0875;
(Continued)

(56) References Cited

U.S. PATENT DOCUMENTS

2007/0247086 A1* 10/2007 Chiu ................... H05B 37/0272
                                                           315/291
2011/0012530 A1*  1/2011 Zheng ................ H05B 33/0815
                                                           315/294
(Continued)

FOREIGN PATENT DOCUMENTS

TW   201336345 A    9/2013
WO   2011008635 A1  1/2011
(Continued)

*Primary Examiner* — Tung X Le
*Assistant Examiner* — Henry Luong

(57) ABSTRACT

The invention describes an LED lighting system (1) comprising a wireless communication arrangement (11, 12) for wireless transfer of signals ($D_{10\_11}$, $D_{11\_12}$, $D_{4\_12}$, $D_{5\_12}$) between devices (10, 11, 12, 4, 5) of the LED lighting system (1); at least one LED lamp (10) connectable to a mains power supply (2), which LED lamp (10) comprises a driver arrangement (100) with a control unit (102) for controlling the LED lamp (10) according to a received signal ($D_{10\_11}$); a phase-cut detector (103A, 103B, 103C) realized to detect a phase-cut input ($V_{cut}$) to the LED lamp (10); and a protection circuit (106) realized to prevent operation of the LED lamp (10) with the phase-cut input ($V_{cut}$) if the phase-cut angle of the phase-cut input ($V_{cut}$) exceeds a critical threshold, wherein said protection circuit (106) is adapted to prevent an exposure of the LED lamp to the phase-cut input. The invention further describes an LED
(Continued)

lamp (10) comprising a driver arrangement (100); and a method of controlling an LED lighting system (1).

11 Claims, 6 Drawing Sheets

(58) Field of Classification Search
CPC ... H05B 37/02; H05B 41/382; H05B 41/3924
USPC .......................... 315/291, 307–308, 300, 302
See application file for complete search history.

(56) References Cited

U.S. PATENT DOCUMENTS

| | | | |
|---|---|---|---|
| 2011/0187271 A1 | 8/2011 | Bouws et al. | |
| 2011/0193488 A1* | 8/2011 | Kanamori | H05B 33/0809 315/209 R |
| 2011/0254525 A1* | 10/2011 | Gaknoki | H05B 33/0815 323/283 |
| 2012/0243231 A1 | 9/2012 | Vadai et al. | |
| 2012/0286770 A1 | 11/2012 | Schroeder et al. | |
| 2013/0175931 A1* | 7/2013 | Sadwick | H05B 37/02 315/158 |

FOREIGN PATENT DOCUMENTS

| | | |
|---|---|---|
| WO | 2011073865 A1 | 6/2011 |
| WO | 2013165850 A1 | 11/2013 |
| WO | 2013177167 A1 | 11/2013 |

\* cited by examiner

LED LIGHTING SYSTEM

CROSS-REFERENCE TO PRIOR APPLICATIONS

This application is the U.S. National Phase application under 35 U.S.C. § 371 of International Application No. PCT/EP2015/075496, filed on Nov. 3, 2015 which claims the benefit of Patent Application No. PCT/CN2014/090239, filed on Nov. 4, 2014 and European Patent Application 14195553.4. These applications are hereby incorporated by reference herein.

FIELD OF THE INVENTION

The invention describes an LED lighting system, and a method of controlling an LED lighting system.

BACKGROUND OF THE INVENTION

Known types of indoor lighting arrangements can comprise various different types of light source such as halogen lamps, incandescent lamps, etc. Such lamps may be used in conjunction with various kinds of dimmers, for example phase-cut dimmers that cut a portion of the mains input power in order to reduce the average power provided to the conventional light source. LED lighting—using light-emitting diodes as light sources—is also becoming more widespread and popular owing to the reduced power consumption and longer lamp lifetimes. LED lamps are available with standard connectors such as E14, E27, GU10 etc., so that these lamps may be used to retrofit existing lighting fixtures. WO2013177167A1 discloses method and apparatus for controlling a lighting device wherein a dimming characteristic in an energy source is detected and a switch is controlled based on the dimming characteristic to transfer energy to the load.

However, such retrofit LED lamps should not be connected to the output of a legacy phase-cut dimmer such as a wall-mounted dimmer, since damage to the LED lamp is likely to occur. The range of a phase-cut dimmer can extend from a minimum (undimmed, corresponding to 100% or maximum light output) up to a maximum (fully dimmed, corresponding to minimum light output), and the "phase-cut angle" defines how much of the 180° half-wave is cut by a leading-edge or trailing-edge dimmer. At a minimum dimming setting, the phase-cut angle can be close to 0°, and at a maximum dimming setting, the phase-cut angle can approach 180°. The average voltage at the input to the lamp is decreased as the phase-cut angle increases. In the case of an LED lamp, this phase-cut voltage is applied to the inputs of the driver, and the reduced voltage can be a problem for the LED driver, particularly at large phase-cut angles. To warn the user, the manufacturer generally provides a printed warning with the lamp. However, this cannot reliably prevent the incorrect installation of the LED lamp.

For some types of LED lamp, it will not be immediately obvious to the user that the lamp has been connected to a legacy dimmer, since the lamp driver will manage to deliver a constant current to the LEDs until a certain maximum phase-cut angle is reached. Until this maximum phase-cut angle is reached, the light output remains essentially constant. Beyond this maximum phase-cut angle, the driver will not be able to match the input power to the required output, and the lamp will exhibit unstable behaviour, for example by noticeably flickering or by ceasing to emit light.

However, even below the maximum phase-cut angle, when the driver can ensure that the light output is constant, the behaviour of the lamp can still be compromised. For example, the sharp voltage increase on a leading-edge phase-cut input can result in a current spike in the lamp circuitry. Furthermore, ripple current can increase significantly in various parts of the lamp circuitry. The current spikes and/or ripple current can ultimately lead to lamp damage, but the effects are not noticeable to the user until the LED lamp starts to behave poorly or fails well before its expected lifetime.

Newer generations of LED lamps, in which the lamp driver has a high power factor, can exhibit a reaction to the dimmer setting of a legacy dimmer, i.e. the light output of LED lamp will be affected by the phase-cut angle. However, these LED lamps are also not intended to be used with a phase-cut dimmer. The user may misinterpret the apparent "response" of the lamp to mean that the lamp is dimmer-compatible, and may even interpret the "response" to actively use the dimmer to adjust the light output. As a result, the LED lamp may show erratic behaviour and may fail well before its expected lifetime.

Since the user may be unaware that an older or newer generation LED lamp has been incorrectly installed in an existing lighting setup, in spite of the manufacturer's printed warning, customer dissatisfaction in the event of premature lamp failure or unsatisfactory behaviour may be directed instead at the lamp and the lamp manufacturer.

Therefore, it is an object of the invention to provide an improved way of incorporating LED lamps into existing lighting arrangements, avoiding the problems described above.

SUMMARY OF THE INVENTION

The object of the invention is achieved by the LED lighting system of claim 1; by the LED lamp of claim 5; and by the method of claim 10 of controlling an LED lighting system.

According to the invention, the LED lighting system comprises a wireless communication arrangement for wireless transfer of signals between devices of the lighting system; at least one LED lamp connectable to a mains power supply, which LED lamp comprises a driver arrangement with a control unit for controlling the lamp according to a received signal received over the wireless communication arrangement; a phase-cut detector realized to detect a phase-cut input to the LED lamp; and a protection circuit realized to prevent operation of the LED lamp with the phase-cut input if the phase-cut angle of the phase-cut input exceeds a critical threshold, wherein said protection circuit is adapted to prevent an exposure of the LED lamp to the phase-cut input.

In the context of the invention, the expression "LED lamp" is to be understood as an LED lighting device comprising one or more light-emitting diodes as light sources, and a driver arrangement comprising one or more drivers for driving the LED light sources, and a control unit for controlling the driver(s). The LED light sources may be enclosed in a transparent or semi-transparent cover such as a glass bulb. The driver arrangement with its driver(s) and control unit may be understood to be incorporated in a housing of the lighting device. To allow the LED lamp to be used to retrofit existing conventional light sources, it may be understood to comprise a suitable socket connector, for example an E27 connector. The expression "connectable to a mains power supply" is to be understood to mean that the voltage input to the LED lamp can be the mains voltage, i.e. the LED lamp does not need a transformer to perform input voltage conversion. The connector and housing may together form a base of the LED lamp. The LED lamp be may be presumed to be incompatible with a legacy dimmer as described in the introduction. Instead, as indicated above, the control unit of the LED device can regulate the driver(s) to achieve a desired light output level ranging between a minimum light output level to a maximum light output level. As explained in the introduction, such LED lamps are not compatible with legacy phase-cut dimmers. While relatively small phase-cut angles (for example up to about 50°) may not noticeably alter the light output and may not cause long-term damage to the driver, a phase-cut angle that exceeds a critical threshold (for example a phase-cut angle greater than 70°, depending on the lamp driver) may indeed result in damage to the driver, even if the damage is not immediately apparent. Therefore, in the context of the invention, detection of a phase-cut input to the LED lamp is to be understood as detection of such a critical phase-cut input. In this way, the method according to the invention ensures that the LED lamp is prevented from operation with a phase-cut input that exceeds a critical phase-cut angle.

An advantage of the LED lighting system according to the invention is that the LED lamp can be reliably protected from damage when inadvertently connected to a legacy dimmer. The LED lamp can be prevented from operation with the phase-cut input in an entirely automatic "self-healing" procedure, so that user interaction is not necessary. The lighting system can also be realized to involve the user, so that lighting system provides the further advantage of raising customer awareness regarding the damage that might ensue when an LED lamp is installed in an existing lighting system. The various ways in which operation of the LED lamp can be prevented with a phase-cut input exceeding a critical level will be explained in detail below.

According to the invention, the LED lamp comprises a driver arrangement with a control unit for controlling the LED lamp according to a signal received from a wireless communication arrangement of an LED lighting system; a phase-cut detector realized to detect a phase-cut input to a driver of the driver arrangement; and a protection circuit realized to prevent operation of the LED lamp with the phase-cut input if the phase-cut angle of the phase-cut input exceeds a critical threshold, wherein said protection circuit is adapted to prevent an exposure of the LED lamp to the phase-cut input.

An advantage of the LED lamp according to the invention is that, with relatively little effort, the lamp can be reliably protected from damage that would result when it is operated from a phase-cut dimmer. The lamp according to the invention can be prevented from operation with the phase-cut input in a number of ways, as will be explained below. A completely automatic response is also possible, so that the LED lamp according to the invention can be reliably protected from damage without having to rely on the user of the lighting system.

According to the invention, the method of controlling an LED lighting system comprises the steps of providing a wireless communication arrangement for wireless transfer of signals between devices of the LED lighting system; providing at least one LED lamp connectable to a mains power supply, which LED lamp comprises a control unit for controlling the lamp according to a signal received over the wireless communication arrangement; detecting a phase-cut input to the LED lamp; and preventing operation of the LED lamp with the phase-cut input by preventing an exposure of the LED lamp to the phase-cut input, if the phase-cut angle of the phase-cut input exceeds a critical threshold.

An advantage of the method according to the invention is that it provides a simple and straightforward way of responding to a phase-cut input to the LED lamp, and can ensure that the LED lamp is protected from a prolonged exposure to such a phase-cut input. The method according to the invention allows the LED lamp to be prevented from operation with the phase-cut input in a fully automatic manner, or in a way that involves an interaction with a user of the lighting system, as will be explained below.

The dependent claims and the following description disclose particularly advantageous embodiments and features of the invention. Features of the embodiments may be combined as appropriate. Features described in the context of one claim category can apply equally to another claim category.

The LED lighting system according to the invention provides a way of ensuring that an LED lamp is not damaged when it is inadvertently connected to a legacy dimmer. Therefore, without restricting the invention in any way, the terms "lamp" and "LED lamp" may be used interchangeably in the following, and the LED lighting system may also be referred to as a "lighting system". Of course, other conventional light sources such as halogen lamps, incandescent lamps, etc. may be connected to a shared power supply of the lighting system. While a conventional light source might draw its power from the same power supply, it is not included in the wireless communication system and is switched on or off using a conventional switch such as a wall-mounted switch.

In the lighting system according to the invention, the LED lamps each comprise a control unit. The control unit can include a microprocessor realized to process input signals and to generate output signals, and may be referred to as a microprocessor control unit (MCU) in the following. The wireless communication arrangement permits wireless transfer of signals between devices of the lighting system, so that lighting control signals can be received by the control units of the LED lamps of the lighting system. There are various known and established protocols for local communication between wireless devices. For example, low-bandwidth wireless devices can communicate with each other over short distances using the Bluetooth protocol. Other technology standards for communication protocols allow radio frequency wireless communication over greater distances. An example of such a communication protocol is the Zigbee® specification. Communication over longer distances is made possible by a mesh network that is formed by the devices of such a system. In a preferred embodiment of the invention therefore, the devices of the lighting system are realised to exchange data using such a Zigbee® communication protocol, for example Zigbee® Light Link, and the lighting system may be assumed in the following to comprise a hub or bridge that issues radio-frequency (RF) commands to the LED lamps using the appropriate protocol. Such a hub or bridge can also communicate over Ethernet in a wireless local area network (WLAN). To this end, the lighting system preferably comprises a wireless routing device such as a WLAN router. Such a router allows multiple devices to communicate over a wireless local area network, and can be used to extend the lighting system to include any device with internet capability.

The lighting system according to the invention can be controlled in the usual manner, for example using wall-mounted switches to turn the lamps on and off. However, in a preferred embodiment of the invention, the lighting system includes a communications device of a user of the lighting system. For example, a device such as a tablet computer, smartphone etc., may also be included in the wireless network. For example, the user can install a suitable software application or "app" on his smartphone to communicate with the hub in order to pass lighting commands to one or more LED lamps of the lighting system.

LEDs lamps are inherently dimmable, and an LED driver can be realized to lower the voltage and/or current to the LEDs in order to achieve the desired light output level. This effect can also be used to obtain a desired light colour when an LED lamp comprises LEDs that emit differently coloured light, for example an LED lamp with red, green and blue LEDs. By adjusting the voltage and/or current to the specific LEDs, essentially any colour can be achieved. In the following, the terms "lamp-specific dimmer setting" and "RF dimmer setting" may be used to distinguish this intentional adjusting of the light output of an LED lamp from an unintentional adjustment by a legacy phase-cut dimmer.

As described above, a legacy phase-cut dimmer operates by "chopping off" a portion of the rectified mains voltage in order to reduce the average voltage to a conventional dimmable light source. The phase-cut angle of the phase-cut dimmer determines the amount of the rectified voltage that is cut. Therefore, in a preferred embodiment of the invention, the phase-cut detector is realized to detect the phase-cut angle of a phase-cut dimmer. This could be achieved by determining the duration during which the input voltage is essentially zero. The lighting system can then react to protect the LED lamp if the phase-cut angle exceeds a critical threshold. This critical threshold may be chosen to be quite low in order to avoid driving the LED lamp with an input signal that may result in undesirable current spikes or current ripple. For example, any phase-cut angle greater than a maximum permissible angle of 130° may be problematic in the long-term for an LED lamp, and the protection circuit of the lighting system according to the invention can prevent operation of the LED lamp when connected to a phase-cut dimmer that is set at a phase-cut angle exceeding that maximum permissible angle.

Detecting the duration of the phase-cut is possible, but this approach requires considerable effort. Therefore, the phase-cut detector of the lighting system according to the invention can detect an undesirable or unacceptable phase-cut angle in a number of alternative ways. For example, detection can be based on a characteristic of the phase-cut input. In one preferred embodiment of the invention, the phase-cut detector comprises an undervoltage detection circuit. This approach is based on the knowledge that the average voltage at the output of the dimmer is reduced according to the phase-cut angle. With increasing phase-cut angle, the average voltage decreases. The phase-cut detector can comprise a means of determining the average voltage, and can output a suitable warning signal when the average voltage is less than a certain threshold level.

In another approach, the phase-cut detector might preferably comprise an overcurrent detection circuit realised to detect a current peak or spike in a relevant part of the lamp circuitry, for example in the current through a driver's output capacitor. Such a current spike is characteristic when a legacy dimmer is used in conjunction with an LED driver, and the "height" of the current spike is related to the phase-cut angle. Such a realisation of the phase-cut detector makes use of this knowledge, and can output a suitable warning signal when the current spike exceeds a certain threshold level.

Detection of the phase-cut angle is indirect and may be difficult, since a legacy dimmer not only cuts the input, but also distorts its waveform. Furthermore, the input waveform to the LED lamp will also depend on the load presented by the lamp. The relatively simple control based on the average voltage may be insufficient in some situations, since the rectified mains voltage is not only dependent on the dimmer setting, but is also dependent on the lamp load, which in turn is dependent on the RF dimmer setting of the LED lamp. The simple control described above may lead to the lamp being put into its "off" state on account of the low average voltage measurement (an accumulation of a relatively small phase-cut angle and an RF dimmer setting) and being put into its "on" state again on account of the "healthy" average voltage, then being put into its "off" state again as the average voltage drops, etc. The control cycle would repeat indefinitely, resulting in lamp flicker.

Therefore, in a further preferred embodiment of the invention, the phase-cut detector of an LED lamp comprises a driver current monitoring circuit for measuring the output current of the lamp's driver, since this is directly related to the lamp's output. Preferably, an averaged or stabilized output current is measured. If the measured current is below a certain threshold, it can be assumed that a phase-cut dimmer is in active use with that lamp. Preferably, the actual RF dimmer setting of the LED lamp is also taken into consideration.

The lighting system according to the invention can use the information provided by the phase-cut detector to activate the protection circuit, which then responds to prevent further operation of the LED from the phase-cut input. This can be achieved in a number of ways. For example, in a straightforward and simple approach, the protection circuit is realized to generate a control signal to the lamp's driver(s) to place the LED lamp in a standby mode of operation. In standby mode, the LEDs of the LED lamp are effectively "off", i.e. the driver does not provide the LEDs with current. The protection circuit can do this essentially immediately when it receives a warning signal from the phase-cut detector. The LED lamp is protected from any further exposure to the phase-cut input and any damage to the lamp can be pre-empted.

In the above example, the user might realize that the LED lamp had been installed in an erroneous setup. However, simply switching the lamp off or into standby might equally well confuse or irritate the user, who may not understand why the lamp has been turned off. Therefore, in a further preferred embodiment of the method according to the invention, the LED lamp is driven to generate a visual warning to a user of the lighting system. For example, in a preferred embodiment of the invention, the LED lamp is operated to output one or more bursts of light essentially immediately when the lamp's control unit detects the presence of a phase-cut input on the power supply to the LED lamp when this is switched on. This visual signal indicates to the user that the setup of the lighting system should be changed. The visual signal can be repeated until the user switches the lamp off, or manually changes the dimmer setting to maximum power input (i.e. a phase-cut angle close to zero, resulting in zero or minimum phase-cut of the power input). If the lamp's control unit detects that no such action has been taken, i.e. the power input to the lamp is still phase-cut, the control unit can then decide to place the LED lamp in a standby mode of operation. Such a situation might arise if the user is not in the same room as the LED lamp, for example when the LED lamp is switched on remotely.

As described above, the lighting system according to the invention includes a user's communications device such as a tablet computer, smartphone, etc. This allows the hub to inform the user of any problems with one or more of the LED lamps. For example, if a phase-cut input is being applied to one or more of the LED lamps, the control unit of each affected lamp can inform the hub, which in turn can send an appropriate warning message to the app running on the user's smartphone or tablet computer. In a preferred embodiment of the invention, the message comprises a set of instructions to assist the user in correcting a configuration of the lighting system. For example, the message can show the user which lamp is being incorrectly operated, and can suggest a remedy to the user. An exemplary message might suggest to the user to correct the dimmer setting of the dimmer to which the lamp is connected, or to install the lamp in a different lighting fixture. If the user does not respond to such a message within a reasonable length of time, the lamp's control unit may still decide to protect the lamp by disconnecting it or placing it in a standby mode of operation.

Some types of legacy dimmer comprise a remote-control interface. This type of dimmer can be used in conventional lighting arrangements so that the user can adjust the light output by means of a hand-held remote control. Therefore, in a further preferred embodiment of the invention, the protection circuit is realized to issue a phase-cut angle correction signal over the wireless communication arrangement to such a remote-controlled dimmer device. Preferably, the phase-cut angle correction signal adjusts the phase-cut angle of the remote-controlled dimmer device to a minimum value. For example, if the dimmer is a leading-edge phase-cut dimmer, its phase-cut angle is preferably altered to be as close as possible to 0°. Since the devices in a Zigbee network are made known to each other, it is possible for the lighting system to determine whether the phase-cut dimmer is indeed such a controllable device. In such a situation, therefore, the lighting system can decide to regulate the dimmer itself, and can choose not to issue the visual warning described above. Instead, it may send a notification to the user's communications device, informing him of the dimming instruction.

In the lighting system according to the invention, adjusting the light output of the LED lamps can be performed over the app running on the user's communications device, for example his smartphone. In another preferred embodiment of the invention, this function can also be performed by a portable dimmer unit capable of wireless communication within the lighting system.

In the method according to the invention, operation of the LED lamp is interrupted as long as the phase-cut input is critical from the point of view of the lamp's driver. In other words, as long as the phase-cut detector determines that the phase-cut angle exceeds a certain threshold, the protection circuit will ensure that the LEDs remain in their "off" state in order to protect the lamp circuitry. The user may react to the feedback—e.g. the visual signal given by the LED lamp, an alert message displayed by the app running on the user's smartphone or tablet, etc.—and may operate the legacy dimmer to return it to a minimum phase-cut angle setting. In a particularly preferred embodiment of the invention, the method further comprises the steps of detecting a permissible input to the LED lamp, and subsequently resuming operation of the LED lamp. In other words, the phase-cut detector can detect whether the input voltage to the driver is now in an acceptable form, for example with a phase-cut angle that is less than the critical phase-cut angle. The protection circuit can then indicate to the driver that it should turn the LED lamp on again. Preferably, the LED lamp resumes operation at the setting that was initially selected by the user, i.e. with the colour and light output settings that were active prior to the lamp being put into its "off" state.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
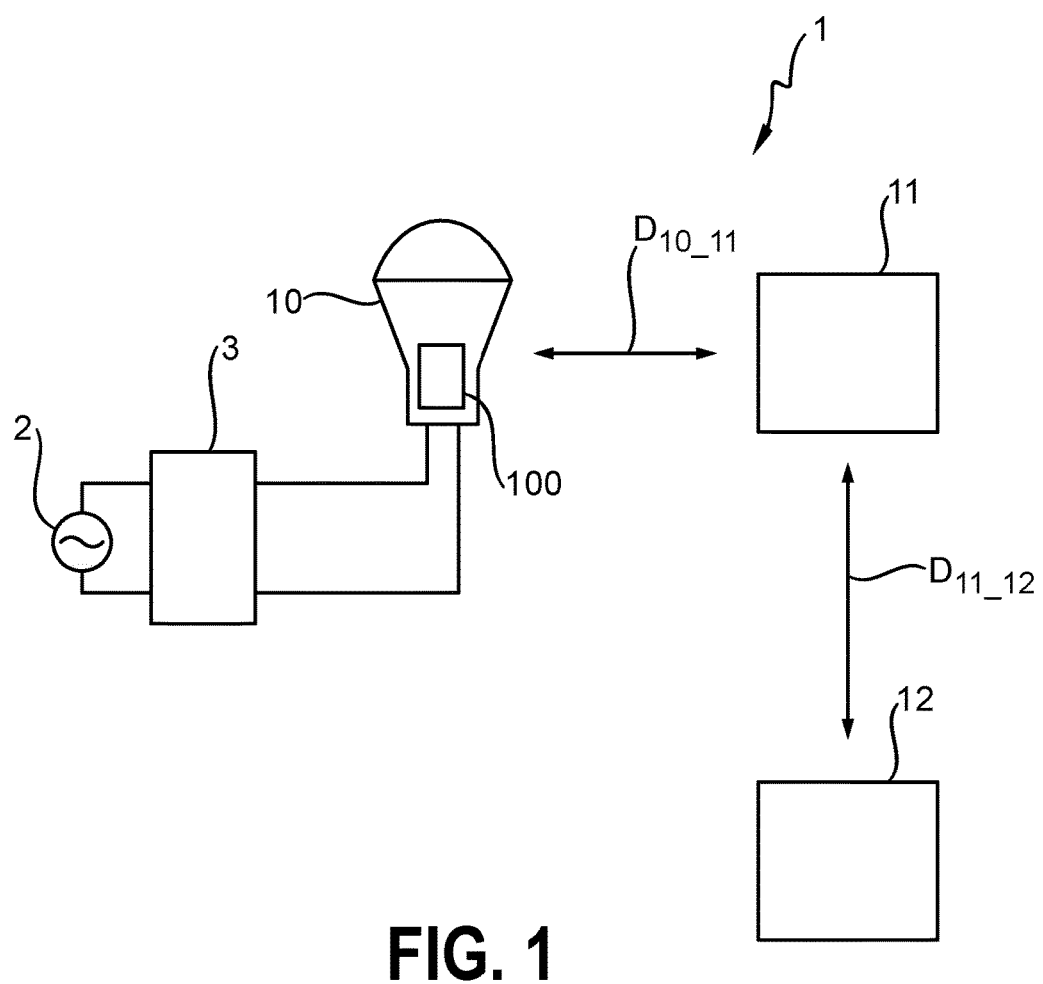
FIG. 1 shows a first embodiment of an LED lighting system according to the invention.

FIG. 1 shows a first embodiment of an LED lighting system 1 according to the invention. In this exemplary embodiment, the LED lighting system 1 comprises a protocol bridge 11 such as a Zigbee® bridge, and a router 12 which can communicate with the bridge over a wireless LAN, for example using an Ethernet protocol. The lighting system 1 comprises at least one LED lamp 10. To keep the drawing simple, only one LED lamp 10 is shown. The LED lamp 10 comprises a driver arrangement 100 with driver and control circuitry. The driver arrangement 100 has a communications interface to allow it to exchange data $D_{10\_11}$ with the bridge 11. In this way, the bridge 11 can send commands to the lamp 10, and the lamp 10 can send a report or feedback to the bridge 11. Furthermore, each lamp 10 of the lighting system 1 can act as a Zigbee® router in a mesh network and can forward commands (originating from the bridge 11) to other lamps of the lighting system 1. In this way, the physical range of the network can be extended. The bridge 11 and any LED lamps 10 can exchange data $D_{10\_11}$ using a suitable protocol such as Zigbee® Light Link.

As explained above, the user of LED lamp 10 can install the lamp 10 in a lighting fixture that is connected to a mains power supply 2. A phase-cut dimmer 3 such as a wall-mounted dimmer 3 may be already present in the user's lighting setup. If the dimmer 3 is set to perform phase-cut on the mains voltage, the power supply to the lamp 10 will be characterized by a sudden voltage change on the leading edge or on the falling edge, depending on the type of phase-cut dimmer 3.

Figure 2:
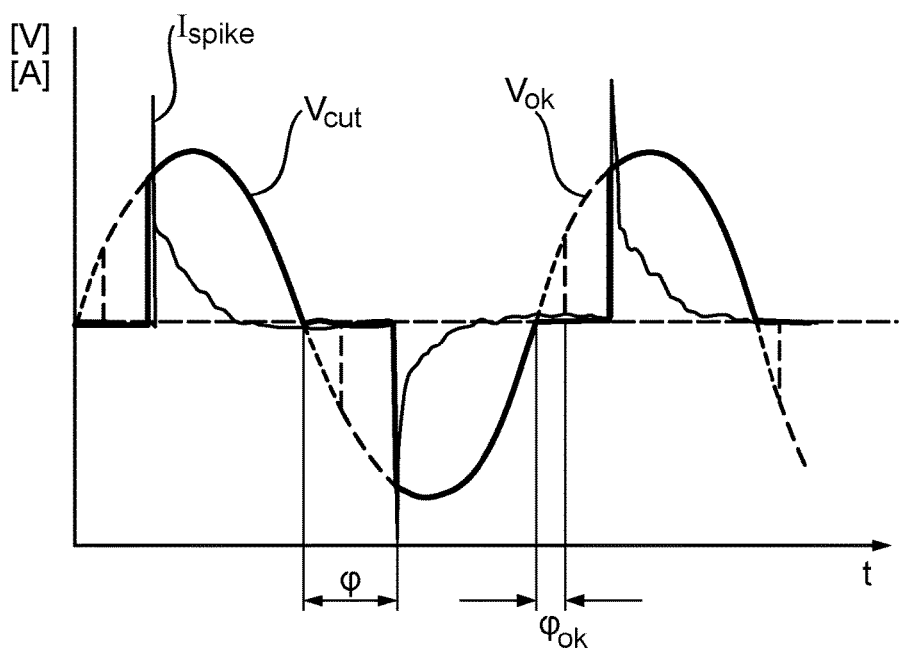
FIG. 2 shows voltage and current waveforms associated with a leading-edge phase-cut dimmer.

An example of an unacceptable or critical phase-cut input $V_{cut}$ is shown in FIG. 2. Here, a leading-edge dimmer set at a phase-cut angle φ of about 60° has cut a portion of the mains voltage (indicated by the dotted line) at the beginning of each half-cycle, resulting in the phase-cut input $V_{cut}$. The result is a sudden voltage change, which in turn results in a spike in the current $I_{spike}$ through the output capacitor of the lamp's driver. The current spike at large phase-cut angles is problematic for the type of filter circuit that is generally used in a low power-factor LED driver design. In such a driver, a pi-filter is used to suppress electromagnetic interference (EMI), with a relatively large capacitor across the outputs of the filter. Such a phase-cut input $V_{cut}$ and the resulting current spike will eventually damage the LED lamp 10. Furthermore, the phase-cut results in a reduction in average voltage, which in turn increases the ripple current of the LED lamp, which in turn leads to a significant increase in temperature. To avoid damage resulting from current spikes and high temperatures, the LED lamp 10 according to the invention is provided with a phase-cut detector that can detect a phase-cut input to the LED lamp 10. If the phase-cut detector detects such a phase-cut input, the lighting system 1 applies a protection circuit to prevent operation of the LED lamp 10 with the phase-cut input. The phase-cut detector and protection circuit are explained below. FIG. 2 also indicates an acceptable or uncritical phase-cut input $V_{OK}$ (indicated by the broken line), for which the legacy phase-cut dimmer is set at a relatively small phase-cut angle $\varphi_{OK}$ of about 20°, corresponding to a low dimmer setting, i.e. maximum or near-maximum light output.

Figure 3:
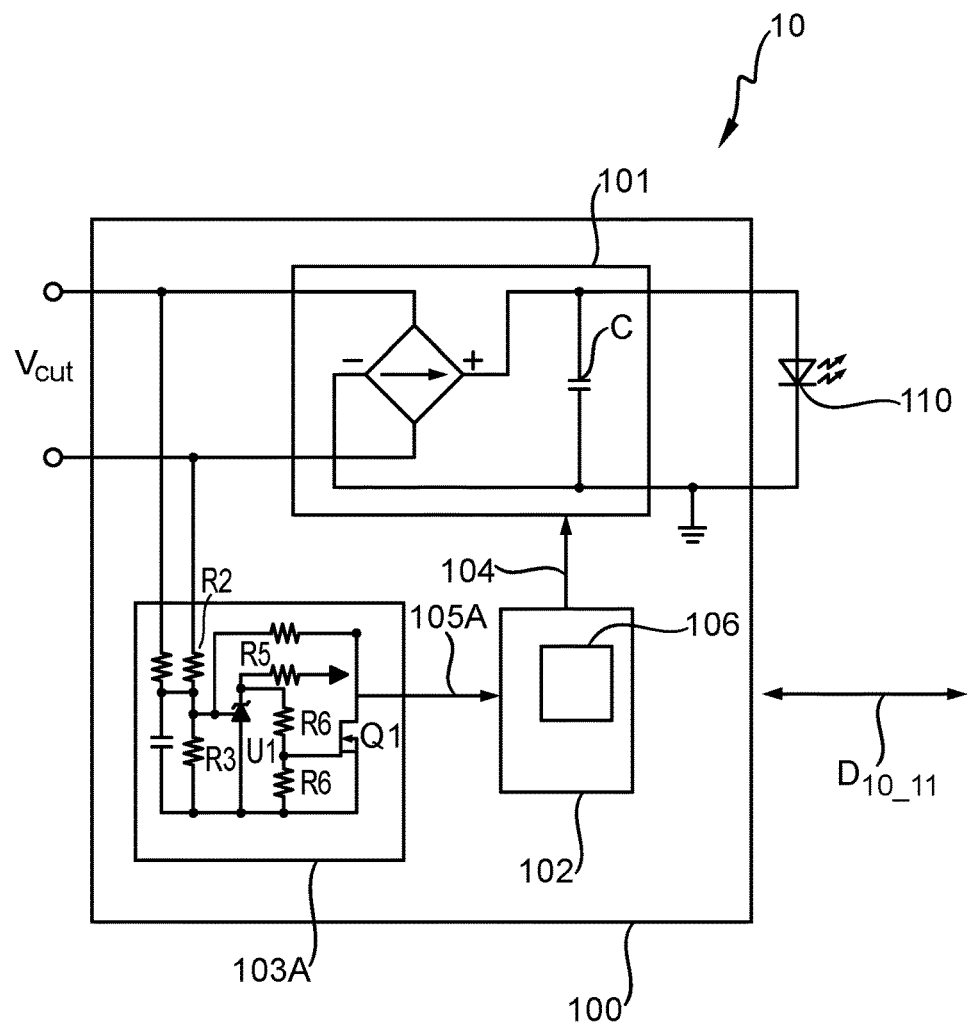
FIG. 3 shows a first embodiment of an LED lamp according to the invention.

FIG. 3 shows a first embodiment of an LED lamp 10 according to the invention. This simplified diagram shows a driver arrangement 100 and an LED light source 110. The driver arrangement 100 comprises a driver 101, which is shown in a very simplified manner. Its function as a rectifier is indicated, and its output capacitor C is also indicated. A pi-filter for suppressing EMI is not shown, but it may be understood that the driver 101 comprises such a filter and that the output capacitor C is an element of the pi-filter. The LED light source 110 can comprise any number of LEDs in any suitable arrangement (for example white and coloured LEDs which can be mixed to provide a wide range of colours), indicated collectively by the LED symbol in the diagram. A microprocessor control unit 102 (MCU) is used to control the driver 101 to provide voltage and current according to the desired light output (the diagram indicates driver 101 and light source 110 in a very simplified manner; in an actual embodiment, different coloured LED strings are driven using appropriate circuitry to obtain the desired colour mix). As described above, the MCU 102 receives commands $D_{10\_11}$ from a protocol bridge. The MCU 102 converts these commands $D_{11\_11}$ into suitable control signals 104 for the lamp's driver(s) 101. In this exemplary embodiment, a phase-cut detector 103A is realised to detect an undervoltage $V_{cut}$ at the inputs to the driver 101. An undervoltage is detected when a phase-cut dimmer between the mains power and the LED lamp 10 has been set to reduce the average voltage. The phase-cut detector 103A generates a signal 105A that informs the MCU 102 when an undervoltage is detected, i.e. that the phase-cut angle is unacceptably large. To deal with this situation, the LED lamp 10 comprises a protection circuit 106. In this exemplary embodiment, the protection circuit 106 is realised as part of the MCU 102 but could of course be realized separately. The protection circuit 106 can be realized in hardware and/or software to react to the undervoltage at the driver inputs. For example, the protection circuit 106 can output a driver control signal 104 which instructs the driver 101 to place the LEDs 110 in standby, thus protecting the lamp circuitry from spike damage. The user may notice that the LED lamp 10 has been turned off. In a further development, the protection circuit 106 can output driver control signals 104 that instruct the driver 101 to cause the LEDs 110 to flash in a controlled manner, for example to flash once every second while at the same time reducing the light output, and then to place the lamp 10 a standby mode. This visual signal can inform the user that the lamp 10 is being "shut down" in a controlled manner, and may prompt him to check the dimmer setting. In a further development, the protection circuit 106 can issue a feedback message $D_{10\_11}$ to the bridge, which in turn can send a message $D_{11\_12}$ (as indicated in FIG. 1) to the WLAN router. If the user of the lighting system has a smartphone or other device running a suitable app, this can display a message forwarded by the router. For example, the feedback might result in an alert on the smartphone display, informing the user that the LED lamp 10 is connected to a dimmer set to perform phase-cut, and that corrective measures must be taken.

Of course, any of these responses can be combined in any appropriate manner. For example, to cover situations in which the user is not in the same room as the LED lamp 10 when this is switched on (e.g. in an burglar-deterrent lighting sequence) and therefore does not see the controlled flashing sequence when the lamp 10 is subsequently off again by the protection circuit 106; and/or does not look at his smartphone display when the alert is displayed and therefore does not see the warning message, the protection circuit 106 can instruct the driver to place the lamp 10 in standby mode if the phase-cut input is still present after a certain length of time. In this way, the lamp 10 is reliably protected from the adverse effects of a phase-cut input voltage and its high performance and long lifetime are safeguarded.

Figure 4:
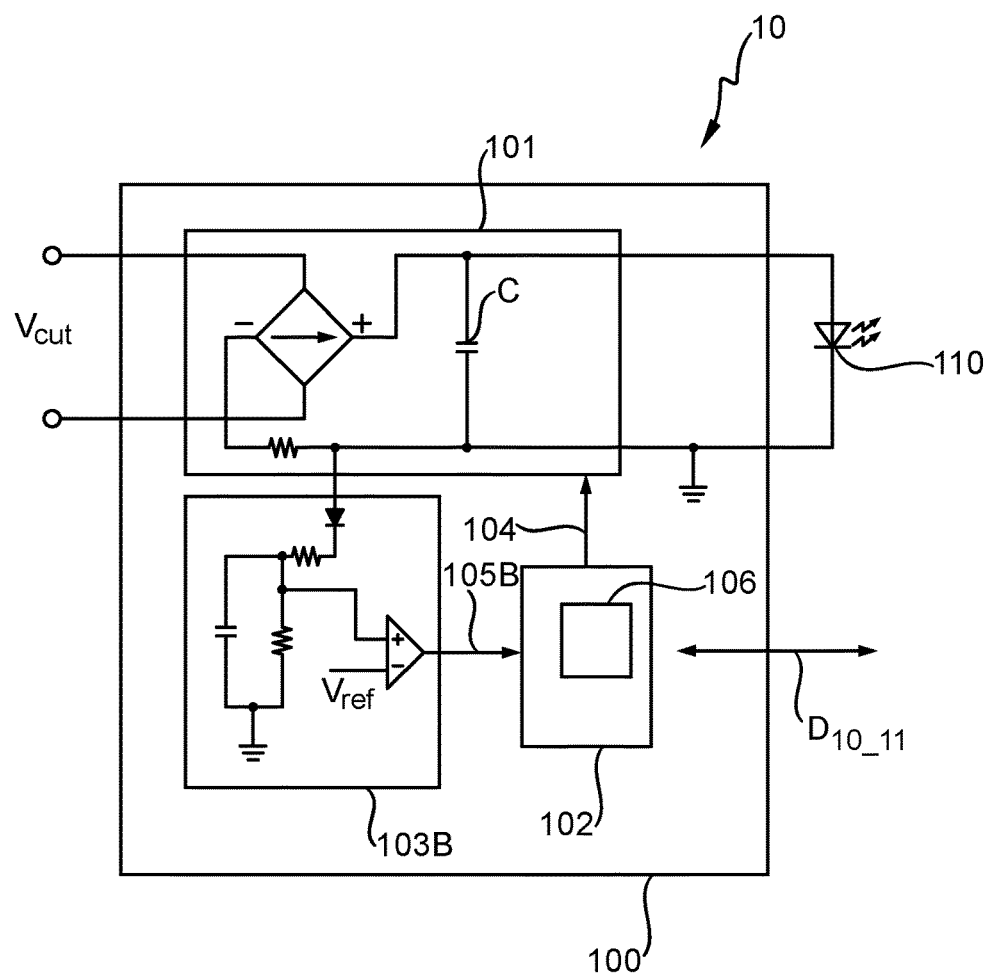
FIG. 4 shows a second embodiment of an LED lamp according to the invention.

FIG. 4 shows a second simplified embodiment of an LED lamp 10 according to the invention, showing an alternative realization of a phase-cut detector 103B. In this case, the phase-cut detector 103B is realized as an overcurrent detector 103B which can detect a spike on the current through the output capacitor C. The presence of such a spike is notified to the MCU 102 in the form of a signal 105B, and the MCU 102 can react in any of the ways already described in Fig. above 3.

Figure 5:
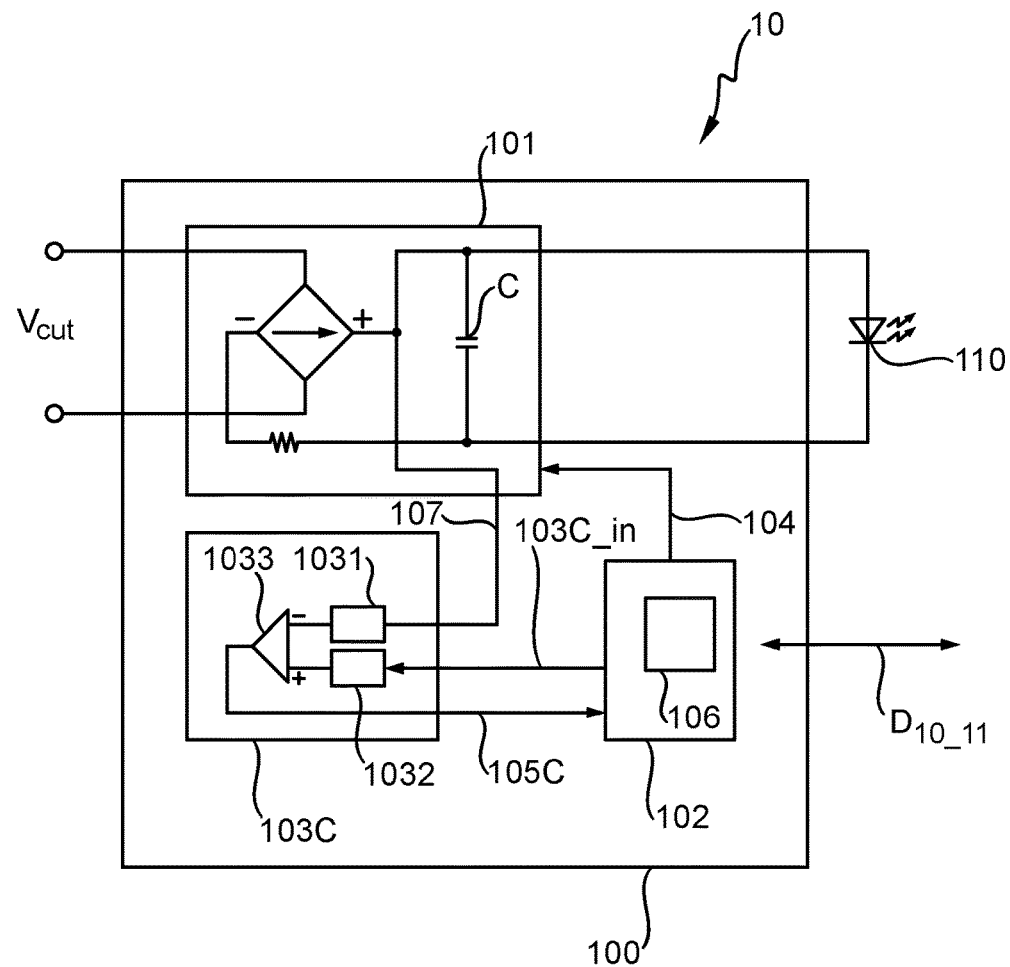
FIG. 5 shows a third embodiment of an LED lamp according to the invention.

FIG. 5 shows a third simplified embodiment of an LED lamp 10 according to the invention, showing a further realization of a phase-cut detector 103C. In this case, the phase-cut detector 103C is realized as a driver output current monitor 103C which monitors the output current 107 of the driver 101 and compares this to an expected value. The driver output current is in the form of a modulated square wave at the switching frequency of the lamp's driver 101. To monitor the average driver output current, therefore, the phase-cut detector 103C comprises a first filter module 1031 for filtering and amplifying the driver output current. A further filter module 1032 serves to filter a pulse-width modulated (PWM) dimming signal originating from the MCU 102, and to bring this to a level corresponding to a maximum acceptable legacy dimmer setting, for example a level corresponding to 70% light output. The filter module outputs are compared in a comparator 1033, whose output 105C indicates to the MCU 102 when a phase-cut dimmer with an unacceptably large phase-cut angle is in active use with this lamp 10. The MCU 102 can respond as described in the preceding two embodiments, for example, the protection circuit 106 can output a driver control signal 104 which instructs the driver 101 to place the LEDs 110 in standby, thus protecting the lamp circuitry from spike damage.

Figure 6:
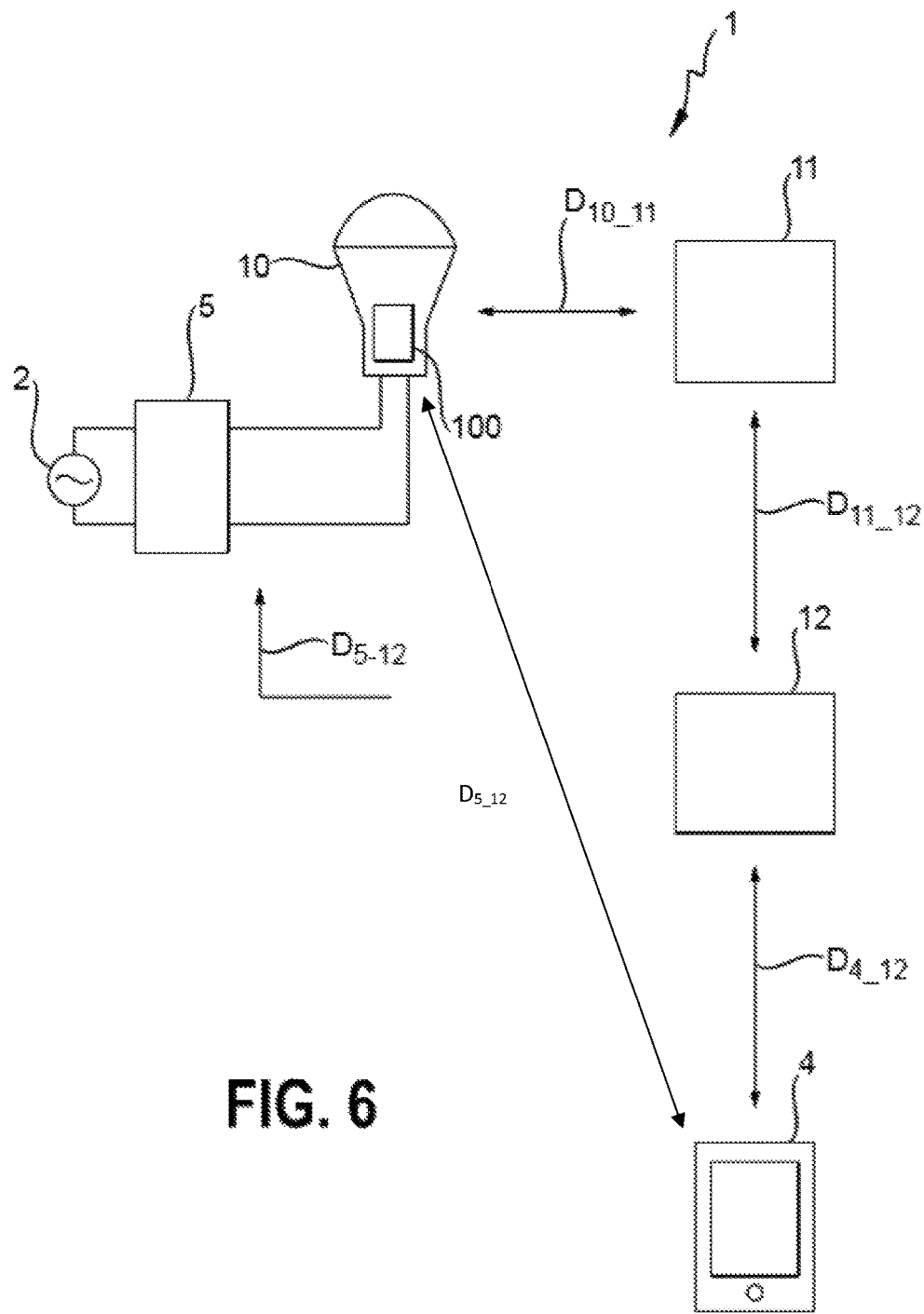
FIG. 6 shows a second embodiment of an LED lighting system according to the invention.

FIG. 6 shows a second embodiment of an LED lighting system 1 according to the invention. This diagram shows further devices 4, 5 that can be included as part of the lighting system 1 of FIG. 1. Here, a smartphone 4 is included in the lighting system 1 by means of an app that runs on the smartphone 4, and which can exchange data $D_{4\_12}$ with the WLAN router 12. A wireless dimmer 5 is also shown. This can be a radio-frequency (RF) controllable legacy "smart dimmer" 5 used to control dimming levels of a conventional light source such as a halogen lamp. Usually, such a dimmer is controlled by a hand-held remote control device. In the lighting system 1 according to the invention, the router 12 can also issue control signals $D_{5\_12}$ to the dimmer 5.

The diagram shows an embodiment in which an LED lamp 10 according to the invention is used to retrofit an existing conventional lighting fixture. If the phase-cut detector of the lamp 10 detects a phase-cut voltage at the driver input and/or a spike on the output capacitor current as described above, the control unit 102 of the lamp 10 can react in any of the ways described above. In addition, the bridge 11 or WLAN router 12 can control the dimmer 5 to reduce the phase-cut angle to a minimum, i.e. to reduce the phase-cut to a minimum. This step can be carried out automatically upon detection of a phase-cut input, or after a certain length of time has elapsed without the user responding to a warning alert or to a flashing of the LED lamp 10.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" does not preclude the use of more than one unit.

The invention claimed is:

1. An LED lighting system comprising a wireless communication arrangement for wireless transfer of signals ($D10\_11$, $D11\_12$, $D4\_12$, $D5\_12$) between devices of the LED lighting system; the LED lighting system comprising:
    at least one LED lamp connectable to a mains power supply, wherein the LED lamp includes a driver arrangement, wherein the driver arrangement includes,
        a control unit for controlling the LED lamp according to a received signal ($D_{10\_11}$) received from the wireless communication arrangement of the LED lighting system;
        a phase-cut detector realized to detect a phase-cut input ($V_{cut}$) to a driver of the driver arrangement; and
        a protection circuit realized to prevent operation of the LED lamp with the phase-cut input ($V_{cut}$) as long as a phase-cut angle of the phase-cut input ($V_{cut}$) exceeds a critical threshold by preventing an exposure of the LED lamp to the phase-cut input, and
    a remote-controlled dimmer device, and wherein the protection circuit is realized to issue a phase-cut angle correction signal ($D5\_12$) over the wireless communication arrangement to the remote-controlled dimmer device.

2. The LED lighting system according to claim 1, wherein the phase-cut detector is realized to detect the phase-cut angle ($\phi$) of a phase-cut dimmer.

3. The LED lighting system according to claim 2, wherein the phase-cut detector comprises a driver current monitoring circuit.

4. The LED lighting system according to claim 1, wherein the protection circuit is realized to place the LED lamp in a standby mode of operation, and/or the protection circuit is realized to issue the phase-cut angle correction signal ($D_{5\_12}$) over the wireless communication arrangement to the remote-controlled dimmer device.

5. The LED lighting system according to claim 1, wherein said devices of the LED lighting system are realized to communicate according to a Zigbee specification.

6. A method of controlling an LED lighting system, which method comprises steps of:
    providing a wireless communication arrangement for wireless transfer of signals ($D10\_11$, $D11\_12$, $D4\_12$, $D5\_12$) between devices of the LED lighting system;
    providing at least one LED lamp connectable to a mains power supply, which LED lamp comprises a driver arrangement with a control unit for controlling the LED lamp according to a received signal ($D_{10\_11}$);
    detecting a phase-cut input ($V_{cut}$) to the LED lamp; and
    preventing operation of the LED lamp with the phase-cut input ($V_{cut}$) by preventing an exposure of the LED lamp to the phase-cut input, as long as a phase-cut angle of the phase-cut input ($V_{cut}$) exceeds a critical threshold, and
    issuing a phase-cut angle correction signal ($D_{5\_12}$) over the wireless communication arrangement to a remote-controlled dimmer device of the LED lighting system to adjust the phase-cut angle of the remote-controlled dimmer device to a minimum value.

7. The method according to claim 6, wherein the step of preventing operation of the LED lamp with the phase-cut input ($V_{cut}$) comprises a step of issuing a message ($D_{10\_11}$, $D_{11\_12}$, $D_{4\_12}$) over the wireless communication arrangement for presentation by a software application running on a communications device of a user of the LED lighting system.

8. The method according to claim 7, wherein the message ($D_{4\_12}$) comprises a set of instructions to assist the user in correcting a configuration of the LED lighting system.

9. The method according to claim 6, further comprising the step of driving the LED lamp to generate a visual warning to a user of the LED lighting system.

10. The method according to claim 6, further comprising the steps of:
    detecting a permissible input ($V_{OK}$) to the LED lamp; and
    resuming operation of the LED lamp with the permissible input ($V_{OK}$).

11. An LED lamp having a driver arrangement, wherein the driver arrangement comprises
    a control unit for controlling the LED lamp according to a received signal ($D_{10\_11}$) received from a wireless communication arrangement of an LED lighting system;
    a phase-cut detector realized to detect a phase-cut input ($V_{cut}$) to a driver of the driver arrangement; and
    a protection circuit realized to prevent operation of the LED lamp with the phase-cut input ($V_{cut}$) as long as a phase-cut angle of the phase-cut input ($V_{cut}$) exceeds a critical threshold by preventing an exposure of the LED lamp to the phase-cut input, and
    wherein the protection circuit is realized to issue a phase-cut angle correction signal ($D_{5\_12}$) over a wireless communication arrangement to a remote-controlled dimmer device.

* * * * *